Patented May 9, 1950

2,507,131

UNITED STATES PATENT OFFICE 2,507,131

METHOD OF INCORPORATING GAS INTO CLAY SLURRIES

Judith Winston and Frances L. Weinstein, Houston, Tex., assignors to Standard Oil Development Company, a corporation of Delaware No Drawing. Application April 4, 1946, Serial No. 659,660

4 Claims. (Cl. 106—40)

The present invention is directed to a method for producing mineral suspensions of light weight.

The present invention is based on the discovery that certain esters of polyphosphoric acids have the property of facilitating the incorporation of air or other gas into mineral suspensions particularly where these suspensions include colloidal material. These esters make possible the production of clay mixes, for example, containing large quantities of air or other gas in the form of minute bubbles of high stability. They also have a similar effect on cement and concrete mixes. Where the mix to be aerated is colloidally inert, small quantities of colloidal material, such as bentonite or starch, may be incorporated in the mix together with the ester.

The particular esters which have been found suitable for this purpose are the aliphatic esters of the polyphosphoric acids of which pyrophosphoric acid is the first member. Both the monohydric and polyhydric alcohol esters may be employed, although the former are preferred. These esters are preferably employed in the form of their alkali metal salts.

In practicing the present invention, the mineral to be embodied in an aerated suspension is employed in a finely divided state. It is mixed with water to form a highly viscous mixture or mobile paste, small quantities of the ester are incorporated and the mixture violently agitated while being exposed to air or the gas to be incorporated. The mixture fluffs up and assumes the appearance of whipped cream or other aerated gel. The more violent the agitation and the longer it is continued the finer will be the bubbles of gas entrained in the mix. These bubbles are very stable.

Among the esters which are suitable for the practice of the present invention may be mentioned diethyl potassium tetrapolyphosphate, trioctyl potassium tetrapolyphosphate, dibutyl ammonium pyrophosphate, tri-isoamyl ammonium tetrapolyphosphate, penta isoamyl ammonium tripolyphosphate, dicapryl triethylamine pyrophosphate, di-isoamyl ammonium pyrophosphate, dimethyl sodium pyrophosphate, tricapryl potassium tetrapolyphosphate, trioctyl sodium tetrapolyphosphate, penta isoamyl sodium tripolyphosphate, di-isoamyl sodium pyrophosphate, tetra normal butyl trithiopyrophosphate, tetraethyl trithiopyrophosphate, penta capryl potassium tripolyphosphate, di-isoamyl potassium pyrophosphate, penta octyl tripolyphosphate, diethyl ammonium pyrophosphate, penta ethyl ammonium tripolyphosphate, triethyl ammonium tetraphosphate, penta ethyl potassium tripolyphosphate. In the preceding and following designation of the esters embraced in this invention, it is to be understood that the compounds referred to are esters in which one of the ester substituents is replaced with an alkali metal. Thus, as herein used, the terminology "penta capryl potassium tripolyphosphate" refers to a tripoly phosphate ester in which all substitutable hydrogen atoms are replaced with a single potassium atom and capryl radical. The compound may be considered to be the alkali metal salt of the penta capryl ester of tripolyphosphoric acid.

In a typical demonstration of the aerating effect of these esters, a suspension of a Texas ceramic clay containing 30% clay in water was prepared. This suspension had a viscosity of about 30 cp. as measured on the Stormer viscosimeter at 600 R. P. M. .01 gram of penta capryl potassium tripolyphosphate was added to 100 ccs. of the suspension and the mixture stirred on a high speed stirrer while exposed to air. Large quantities of air were entrained in the mixture and its viscosity increased to 84 cp. Additional increments of the phosphate were added with high speed stirring until .08 gram of the phosphate was incorporated in the mix. At this point the mixture had a viscosity of 175 cps. and was in the form of a stiff gel in which were entrained minute bubbles of air. The quantity of air entrained may be gauged from the fact that the density of the suspension before the treatment with the chemical and stirring was 9.65 pounds per gallon and after the incorporation of .08 gram of the phosphate with high speed stirring the density was 6.08 pounds per gallon. It may be mentioned that the limit of entrainment of air had not been reached as the curve had a sharp upward trend after the last addition of phosphate.

It will be understood that this example is given only to demonstrate the airifying powers of the chemical. In actual practice much heavier suspensions of clay will be employed where the production of cast articles is desired.

In order to increase the bonding power of the mix, it is desirable to incorporate in it a highly colloidal material such as Wyoming bentonite. The inclusion of this material also increases the airifying power of the chemical. For example, .08 gram of penta octyl potassium tripolyphosphate increased the viscosity of the 30% suspension of ceramic clay previously mentioned from 30 to 100 cp., while the same amount of the same ester increased the viscosity of a 20% suspension of the same ceramic clay containing about 4% by weight of Wyoming bentonite from 35 cp. to 160 cp. The mix containing the colloidal material is considerably more stable in its airified form than the less colloidal mix.

A thick slurry of Florida Portland cement in water containing 40% by weight of the water was thoroughly mixed. It had a density of 16.15 pounds per gallon. To this mix was added 0.4% by weight of penta capryl tripolyphosphate. After agitation for three minutes in the presence of air, the density of the mixture was reduced to 13.5 pounds per gallon. This was without any deliberate injection of air or other gas into the mix, but only with exposure of the mix to air. Much greater reductions in density can be secured by suitably jetting air or other gas into the mix during the stirring or in lieu of the stirring.

A 40% slurry of Florida Portland cement, in which had been incorporated 2% by weight highly colloidal Wyoming bentonite had a density of 16.0 pounds per gallon prior to treatment with the phosphate esters. After addition of penta capryl potassium tripolyphosphate to the extent of 0.4% of the slurry weight and agitating for three minutes, the density was reduced to 13.3 pounds per gallon. The corresponding specific gravities of completely hydrated and set briquettes of a similarly treated and untreated slurry were found to be 1.48 and 1.92, respectively.

The nature and objects of the present invention having been fully described, what we desire to claim is:

1. A method for incorporating gas into an aqueous mixture of clay which comprises adding to the mixture a small amount of an ester of tripolyphosphoric acid in which one hydrogen atom is replaced by an alkali metal and the remainder of the hydrogen atoms have been reacted with an esterifying alcohol ROH where R is an aliphatic hydrocarbon radical having up to 8 carbon atoms, and agitating said mixture violently in the presence of a gas to be incorporated.

2. The method of claim 1 in which the said ester is a capryl ester of tripolyphosphoric acid.

3. The method of claim 1 in which the said ester is an octyl ester of tripolyphosphoric acid.

4. A method for incorporating gas into an aqueous mixture of clay which comprises adding to the mixture a small amount of an ester of tripolyphosphoric acid in which one hydrogen atom is replaced by an alkali metal and the remainder of the hydrogen atoms have been reacted with an esterifying alcohol ROH where R is an aliphatic hydrocarbon radical having up to 8 carbon atoms, and a small amount of a bentonite, and agitating said mixture violently in the presence of a gas to be incorporated.

JUDITH WINSTON.
FRANCES L. WEINSTEIN.

REFERENCES CITED

The following references are of record in the file of this patent:

UNITED STATES PATENTS

| Number | Name | Date |
|---|---|---|
| 1,782,383 | Greider | Nov. 18, 1930 |
| 2,176,078 | Katzman | Oct. 17, 1939 |
| 2,190,769 | Butz | Feb. 20, 1940 |
| 2,193,965 | Hochwalt | Mar. 19, 1940 |